(12) United States Patent
Moradnia et al.

(10) Patent No.: US 11,673,618 B2
(45) Date of Patent: Jun. 13, 2023

(54) FLEXIBLE AND STORABLE ACTIVE SPOILER SYSTEM

(71) Applicant: Honda Motor Co., Ltd., Tokyo (JP)

(72) Inventors: Pirooz Moradnia, Dublin, OH (US); Matthew L. Metka, Plain City, OH (US); David J. Rose, West Mansfield, OH (US)

(73) Assignee: Honda Motor Co., Ltd., Tokyo (JP)

( * ) Notice: Subject to any disclaimer, the term of this patent is extended or adjusted under 35 U.S.C. 154(b) by 192 days.

(21) Appl. No.: 17/219,770

(22) Filed: Mar. 31, 2021

(65) Prior Publication Data

US 2022/0315135 A1 Oct. 6, 2022

(51) Int. Cl.
*B62D 37/02* (2006.01)
*B62D 35/00* (2006.01)

(52) U.S. Cl.
CPC .......... *B62D 37/02* (2013.01); *B62D 35/007* (2013.01)

(58) Field of Classification Search
CPC .............................. B62D 37/02; B62D 35/007
See application file for complete search history.

(56) References Cited

U.S. PATENT DOCUMENTS

| | | | |
|---|---|---|---|
| 5,294,170 A * | 3/1994 | Hsueh | B60J 11/02 |
| | | | 296/180.1 |
| 7,150,494 B2 | 12/2006 | Bangle et al. | |
| 9,096,279 B2 | 8/2015 | Beierl et al. | |
| 9,233,601 B2 | 1/2016 | Lee et al. | |
| 9,540,053 B2 | 1/2017 | Reuvekamp et al. | |
| 9,902,437 B2 | 2/2018 | Demange et al. | |
| 10,518,502 B2 | 12/2019 | Iwano | |
| 2007/0186966 A1* | 8/2007 | Hacker | B60J 11/00 |
| | | | 296/136.03 |
| 2010/0301633 A1* | 12/2010 | Chen | B62D 35/007 |
| | | | 296/180.1 |

FOREIGN PATENT DOCUMENTS

| | | | | |
|---|---|---|---|---|
| CN | 104842757 B | | 3/2018 | |
| CN | 112203929 A | * | 1/2021 | ........... B62D 35/007 |
| DE | 4422285 A1 | * | 1/1995 | ........... B60J 11/025 |
| DE | 202009006950 U1 | * | 9/2009 | ............. B60J 11/02 |
| DE | 10102756 B4 | | 9/2016 | |
| DE | 102018209474 A1 | * | 12/2019 | |
| DE | 102018209474 A1 | | 12/2019 | |
| FR | 2576255 A1 | * | 7/1986 | |
| FR | 2982568 B1 | | 11/2013 | |
| JP | 2020082869 A | | 6/2020 | |
| WO | 2017063643 A1 | | 4/2017 | |
| WO | 2019233648 A1 | | 12/2019 | |
| WO | WO-2020219438 A1 | * | 10/2020 | ........... B62D 35/007 |

* cited by examiner

*Primary Examiner* — Lori L Lyjak
(74) *Attorney, Agent, or Firm* — Plumsea Law Group, LLC

(57) ABSTRACT

An active spoiler system for a vehicle is disclosed that changes from a stowed position to a deployed position. In the stowed position, one or more flexible sheets are stored on rollers inside the body of the vehicle. The flexible sheets are pulled outward out of the body of the vehicle by a rigid bar that rotates around a pivot, in response to a controller. The deployed active spoiler may decrease drag thereby increasing fuel efficiency, while also allowing for the active spoiler to be stowed when not needed due to road or weather conditions.

20 Claims, 10 Drawing Sheets

FLEXIBLE AND STORABLE ACTIVE SPOILER SYSTEM

TECHNICAL FIELD

The present disclosure relates to the field of vehicle active spoiler systems.

BACKGROUND

Broadly, known vehicle designs include a variety of aerodynamic structures commonly referred to as spoilers. Spoilers include any of a wide range of structures that attach to the exterior of a vehicle body in order to disrupt, or "spoil", disadvantageous airflow around the vehicle in order to guide the air flow (which is separating from the body of the vehicle) toward a desired direction. Spoilers may reduce drag, and may also reduce lift, in order to help the vehicle achieve improved performance. Namely, a spoiler may allow a vehicle to achieve improved fuel efficiency or improved stability at high speeds. Rear spoilers are a common accessory on a large number of vehicle designs.

However, spoiler design involves various tradeoffs. For example, a spoiler that may increase vehicle performance under some conditions may also be disadvantageous under other conditions. For example, a rear spoiler that is larger may create reduced drag at high speeds but also decrease stability under unfavorable weather conditions. As a result, active spoiler systems have been developed that change configuration while in use. Active spoiler systems differ from static spoiler systems in that active spoilers change shape in some way. However, known active spoiler systems suffer from disadvantages including complexities related to the actuation and storage of the moving components.

Accordingly, there is a need in the art for improved active spoiler systems that addresses these challenges and other shortcomings in the art.

SUMMARY

In one aspect, this disclosure provides a vehicle including an active spoiler system comprising: a flexible sheet; a roller housed in an interior of a vehicle body, the roller being attached to a first end of the flexible sheet such that at least a portion of the flexible sheet is spooled on the roller when the active spoiler system is in a first configuration; a rigid bar located on a rear side of the vehicle, the rigid bar being attached to a second end of the flexible sheet; wherein the rigid bar is configured to move from a first position to a second position in such a way as to cause the flexible sheet to unspool from the roller and extend outward from the rear side of the vehicle thereby acting as a spoiler when the active spoiler system is in a second configuration.

In another aspect, this disclosure provides vehicle including an active spoiler system comprising: a plurality of rollers, each roller being housed in an interior of a vehicle body at an upper portion of a rear side of the vehicle; a plurality of flexible sheets, each flexible sheet being attached to one of the plurality of rollers at a respective first of each flexible sheet end such that at least a portion of each flexible sheet is spooled on each respective roller when the active spoiler system is in a first configuration; a rigid bar located on the rear side of the vehicle, and extending horizontally across the rear side of the vehicle from a first lateral side of the vehicle to a second lateral side of the vehicle, the rigid bar being attached to each of the plurality of flexible sheets at a respective second end of each flexible sheet; wherein the rigid bar is configured to rotate rearward and downward around an axis in order to move from a first position to a second position, the rotation of the rigid bar causing each of the plurality of flexible sheets to unspool from each of the respective plurality of rollers and extend outward from the rear side of the vehicle thereby acting as a spoiler when the active spoiler system is in a second configuration.

In still another aspect, this disclosure provides an active spoiler apparatus comprising: a center flexible sheet; a center roller housed in an interior of a vehicle body at a upper portion of a rear side of the vehicle, the center roller being attached to a first end of the center flexible sheet such that at least a portion of the center flexible sheet is spooled on the center roller when the active spoiler system is in a first configuration; a side screen located adjacent to a lateral side of the vehicle; the side screen being aligned vertically along the lateral side of the vehicle, the side screen further being at least partially stowed in the interior of the vehicle body when the active spoiler system is in the first configuration; a rigid bar located on a rear side of the vehicle, the rigid bar being attached to a second end of the flexible sheet, a second end of the first side flexible sheet, and a second end of the second side flexible sheet; and wherein the rigid bar is configured to move from a first position to a second position in such a way as to cause the center flexible sheet to unspool from the center roller and extend outward, and cause the side screen to move from a first position to a second position, thereby acting as a spoiler when the active spoiler system is in a second configuration.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Active spoiler apparatuses for vehicles are described herein. According to the techniques of the example embodiments, the vehicle including an active spoiler system may be used to achieve improved fuel efficiency and stability at high speeds while nonetheless also avoiding vehicle performance degradation under e.g. low speeds or poor weather conditions. Generally, embodiments of this disclosure are variously shown in FIGS. 1 through 10.

A variety of terms are used in this disclosure. These terms are used with reference to the following definitions and descriptions, as well as the knowledge of a person having ordinary skill in the art of vehicles.

The term "vehicle" as used throughout this disclosure may refer to any moving vehicle that is capable of carrying occupants or cargo—whether powered or unpowered. Vehicles may broadly include motor vehicles, such as cars, trucks, and SUVs, as well as trailers and other non-motorized means of transportation of occupants or cargo. The term "motor vehicle" as used throughout this disclosure may refer to any vehicle that is capable of carrying one or more human occupants and is powered by any form of energy. The term "motor vehicle" includes, but is not limited to: cars, trucks, vans, minivans, SUVs, motorcycles, scooters, boats, personal watercraft, and aircraft.

The term "spoiler" as used throughout this disclosure may refer to any structure configured to interrupt airflow around a vehicle.

Figure 1:
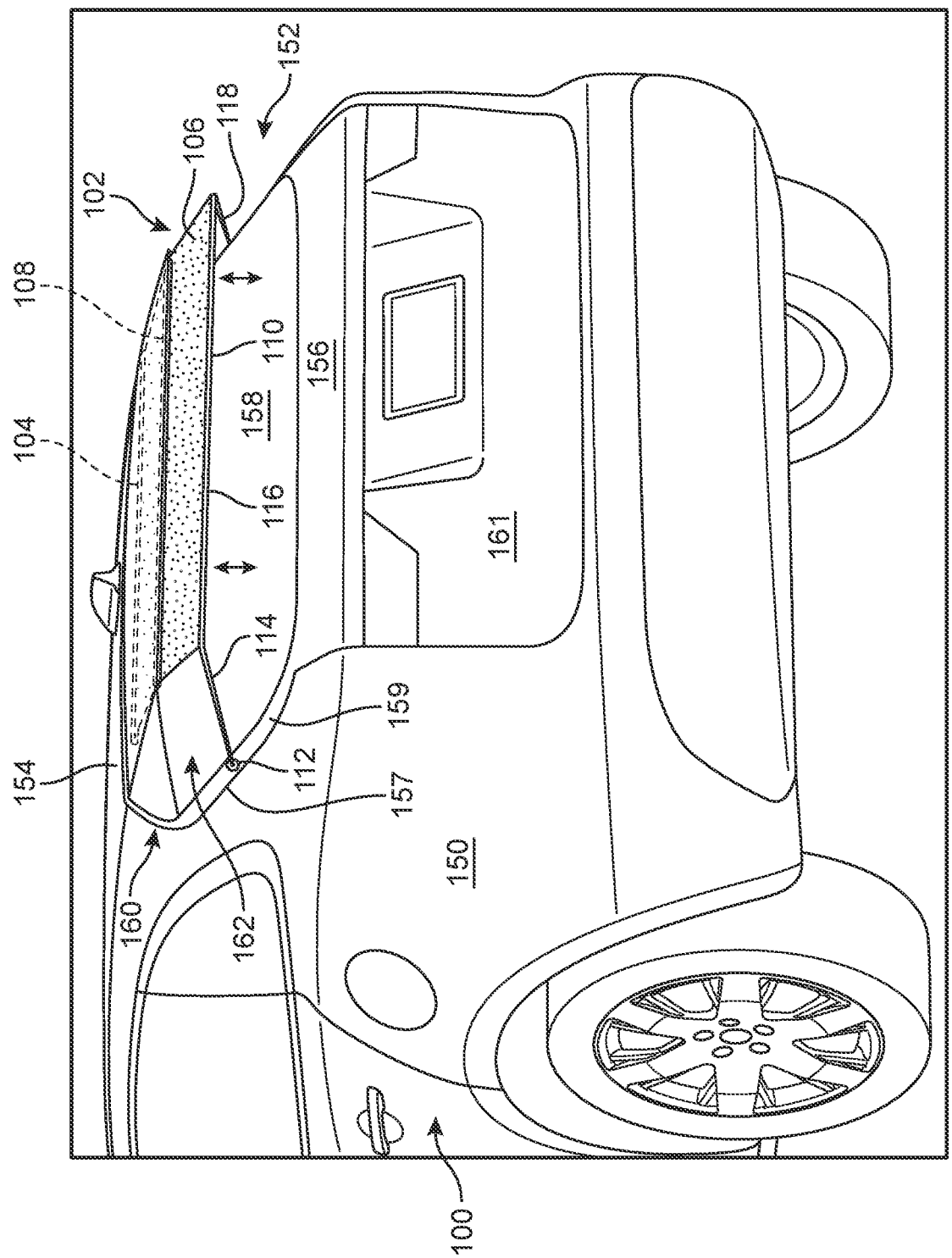
FIG. 1 is an isometric view of a vehicle including a first embodiment of an active spoiler system in accordance with this disclosure.

FIG. 1 shows an isometric rear view of a motor vehicle 100 that includes an active spoiler system 102 in accordance with this disclosure. Active spoiler system 102 may be located on a rear side 156 of motor vehicle 100, at an upper portion 162 of rear side 156 that is adjacent to a roof 154 of motor vehicle 100. Active spoiler system 102 is shown in FIG. 1 in a deployed configuration, as the active spoiler system 102 would be when in use.

In an example embodiment, active spoiler system 102 may include a roller 104 housed in an interior of the body of motor vehicle 100. In FIG. 1, and throughout this disclosure, components that are inside an interior and being viewed from outside the motor vehicle 100 are shown with dashed lines. Specifically, as used in this disclosure, the phrase "interior of a motor vehicle body" may refer to any location that is covered by the exterior visible surfaces of the vehicle. That is, the interior of a motor vehicle may variously encompass areas inside the structural body of the vehicle, and not necessarily in areas inside the cabin of the vehicle. Accordingly, the interior of the motor vehicle may include areas such as inside a static spoiler, inside a roof structure, inside a lateral side D-pillar structure, inside a rear side hatch door structure, and others.

Roller 104 may be a cylinder that acts as a spool for a flexible sheet 106. Roller 104 may be aligned substantially parallel with roof 154 in upper portion 162 of rear side 156.

In this embodiment, flexible sheet 106 is pulled outward, out of the interior of upper portion 162, by a rigid bar 110. Rigid bar 110 may be located on rear side 156 of motor vehicle 100, extending horizontally across rear side 156 from a first lateral side 150 to a second lateral side 152. In this way, flexible sheet 106 may also extend laterally across at least a portion of a width of rear side 156 of motor vehicle 100 that extends from first lateral side 150 to second lateral side 152.

In this embodiment, flexible sheet 106 is attached to a center portion 116 of rigid bar 110. Rigid bar 110 may include a first side portion 114, center portion 116, and a second side portion 118. First side portion 114 of rigid bar 110 may be attached to a pivot point 112 (also referred to herein as "pivot") adjacent to first lateral side 150 of motor vehicle 100. Pivot 112 may include a motor or other actuator for moving rigid bar 110 from a first position to a second position. A second pivot (not shown) may also be located adjacent to second lateral side 152 that is substantially similar to pivot 112 to which second side portion 118 of rigid bar 110 may be attached.

Specifically, in the particular embodiment shown in FIG. 1, pivot 112 may be located on rear side 156 of vehicle 100 adjacent to first lateral side 150 of vehicle 100. For example, pivot 110 may be located on a rear windshield 158, or on a side portion 159 that surrounds windshield 158 as shown. In the particular embodiment of a motor vehicle 100 shown in FIG. 1, pivot 112, windshield 158, and side portion 159 on rear side 156 are all part of a hatch-back trunk lid 161. Seam 157 may be the demarcation between rear side 156 and lateral side 150. As is commonly known, a trunk lid 161 as shown may open by pivoting upward at one or more hinges that are adjacent to roof 154. Accordingly, in the embodiment shown, active spoiler system 102 may be entirely located on trunk lid 161—including pivot 112. However, in other embodiments (not shown) that are not necessarily a hatch back trunk lid, a pivot point may be located on other locations such as on a lateral side of a motor vehicle.

In the deployed configuration shown in FIG. 1, active spoiler system 102 may therefore extend over a portion of a rear window 158 so as to create a larger spoiler surface and to disrupt unfavorable airflow around rear side 156 of motor vehicle 100. Active spoiler system 102 may include a static upper rear spoiler portion 160 that houses roller 104, as mentioned above, as well as housing at least a portion of flexible sheet 106, and also a pulley 108. Pulley 108 may be configured to direct flexible sheet 106 as it deploys from within static upper rear spoiler portion 160 into the deployed configuration shown in FIG. 1.

Figure 2:
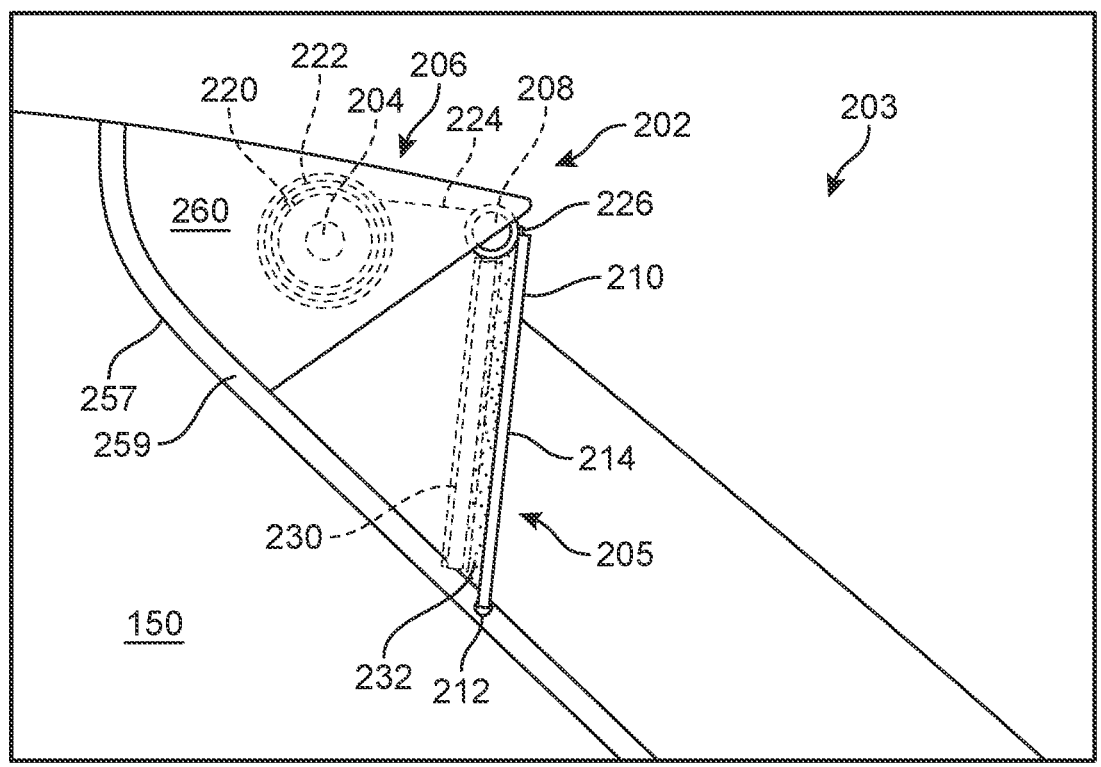
FIG. 2 is side view of a motor vehicle including a second embodiment of an active spoiler system in accordance with this disclosure.
Figure 2:
Figure 2:
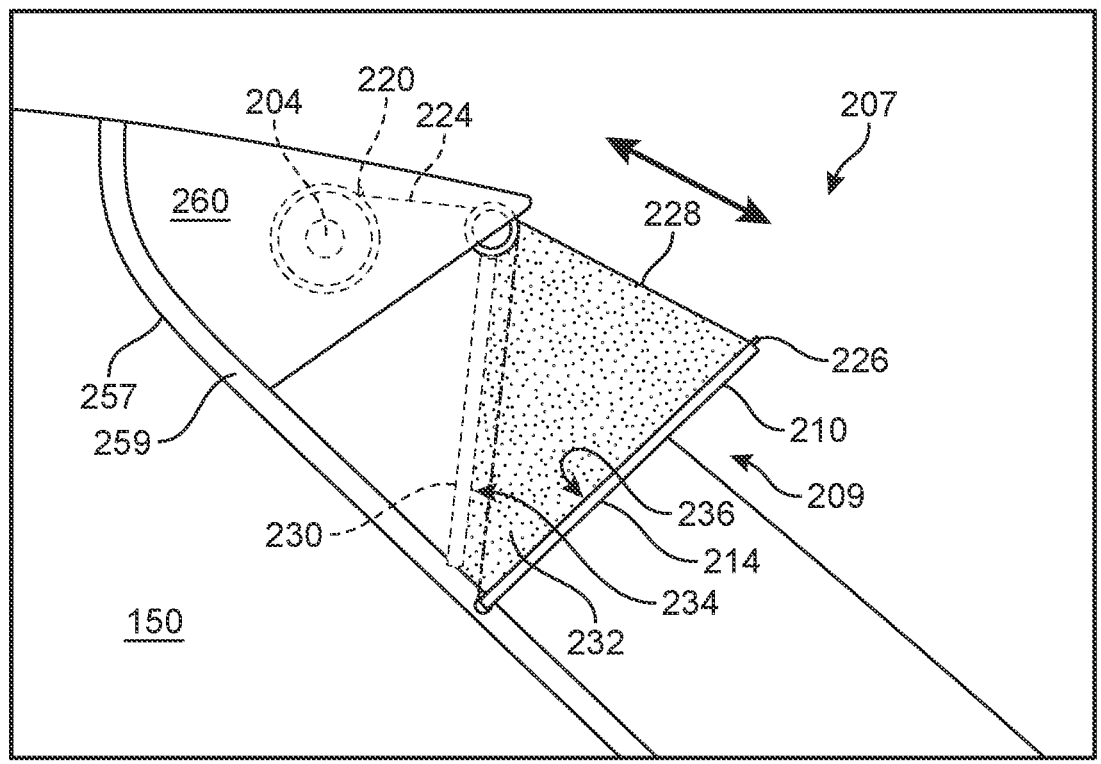

FIG. 2 shows a similar embodiment of an active spoiler system 202 in further detail. Specifically, FIG. 2 shows a side view of active spoiler system 202 that includes a roller 204 housed in an interior of the body of motor vehicle 100. The top configuration shown in FIG. 2 may be the stowed configuration 203, where the active spoiler is not currently in use. In the first, stowed, configuration 203 the flexible sheet 206 may be substantially spooled on roller 204. That is, flexible sheet 206 may be attached to roller 204 at a first end 220 of flexible sheet 206 such that at least a portion 222 of flexible sheet 206 is spooled on roller 204 when active spoiler system 202 is in first configuration 203.

A second end 226 of flexible sheet 206 may then be attached to a rigid bar 210. In the first configuration 203 shown in the top of FIG. 2, rigid bar 210 is in a first position

205. First position 205 of rigid bar 210 may be substantially adjacent to a static upper rear spoiler portion 260. Active spoiler system 202 may also include a pulley 208, such that flexible sheet 206 spools around roller 204, then extends along portion 224 to pulley 208, and then attaches to rigid bar 210 at second end 226 of flexible sheet 206.

In the embodiment shown in FIG. 2, active spoiler system 202 also includes a side roller 230. Side roller 230 may be aligned vertically along first lateral side 150 of motor vehicle 100 and is located such that one end of side roller 230 may be substantially adjacent to one end of roller 204. This embodiment may allow an active spoiler to cover a portion of the D-pillar on first lateral side 150. It should be understood that a substantially similar arrangement may also be provided adjacent to second lateral side 152.

In the bottom configuration shown in FIG. 2, a second, deployed configuration 207 of active spoiler system 202 is shown in a deployed position. In this second configuration 207, rigid bar 210 has moved from first position 205 to a second position 209 in such a way as to cause flexible sheet 206 to unspool from roller 204 and extend outward from an end of static upper rear spoiler portion 260 on rear side 156 of motor vehicle 100 and thereby act as a spoiler. Specifically, flexible sheet 206 may be held taut between roller 204 at one end 220 and rigid bar 210 at second end 226. The movement of rigid bar 210 from first position 205 to second position 209 may therefore create an active spoiler surface 228 formed by flexible sheet 206.

Similarly, the same process may occur with respect to a side roller 230 and a side flexible sheet 232. Side flexible sheet 232 may be attached to side roller 230 at one end 234, and attached to a side portion 214 of rigid bar 210 at second end 236. Side flexible sheet 232 may be attached to rigid bar side portion 214 substantially adjacent to where flexible sheet 206 attaches to rigid bar 210 (e.g., at second end 226). Therefore, the movement of rigid bar 210 from first position 205 to second position 209 may unspool side flexible sheet 232 from side roller 230. As a result, side flexible sheet 232 may extend outward from side portion 259 that is adjacent to first lateral side 150 of motor vehicle 100 (as separated by seam 257), thereby acting as a spoiler in conjunction with flexible sheet 206 when active spoiler system 202 is in second, deployed configuration 207.

In the embodiment shown in FIG. 2, rigid bar 210 may rotate around a pivot point 212 in order to move from first position 205 to second position 209. Specifically, rigid bar 210 may rotate rearward and downward around an axis defined by pivot point 212. Pivot point 212 may include a motor or other actuator that causes rigid bar 210 to move from first position 205 to second position 209.

In some embodiments, pivot point 212 may include an actuator (not shown) that is controlled by a controller (also not shown). A controller may be a specialized computing device, or a general computing device, configured to trigger an actuator so as to deploy active spoiler system 202 to cause it to change configuration from first, stowed configuration 203 to second, deployed configuration 207. For example, the controller may be configured to change the active spoiler system 202 to deploy in response to one or more inputs selected from the group consisting of: vehicle speed, ambient temperature, local precipitation, user inputs, and vehicle performance mode. As a result of this, active spoiler system 202 may deploy when doing so would appropriately improve vehicle performance. The control may also be configured to stow the active spoiler system 202, by changing it from second configuration 207 to first configuration 203, in response to similar inputs. The controller may therefore allow the active spoiler system 202 to be automatically or manually deployed (or stowed).

Figure 3:
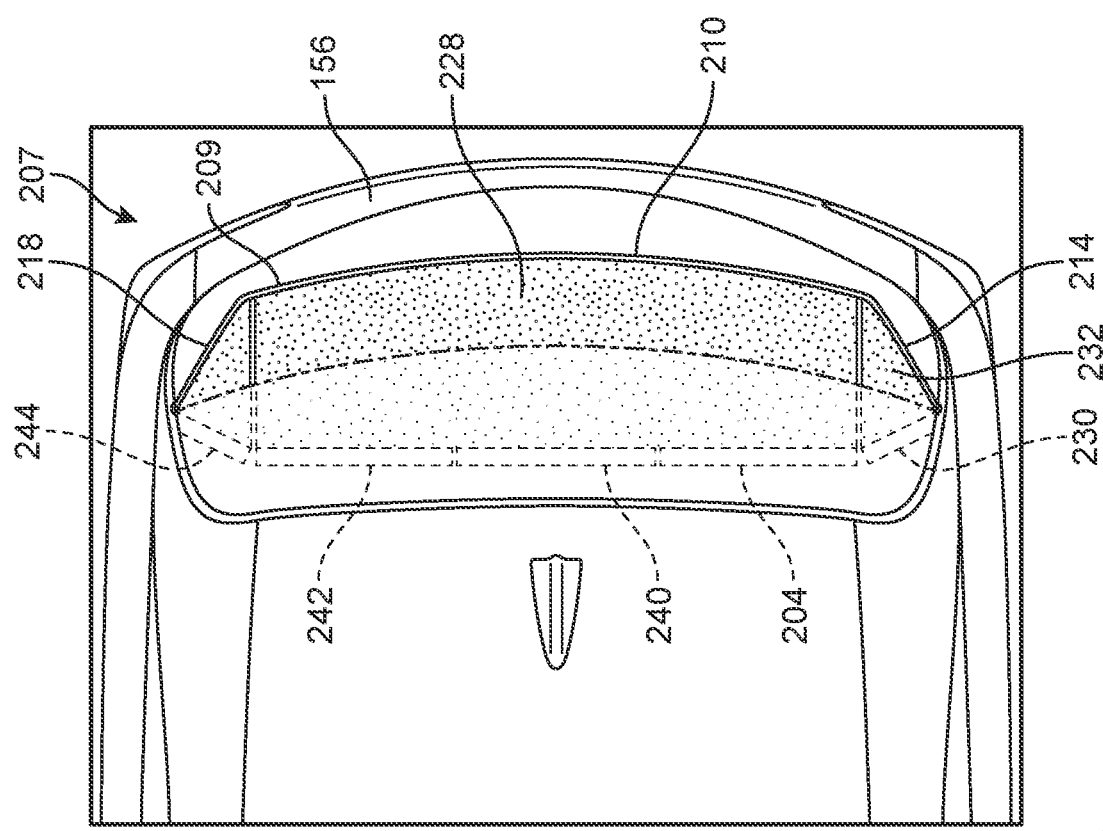
FIG. 3 is a top view of a motor vehicle including the second embodiment of an active spoiler system.
Figure 3:
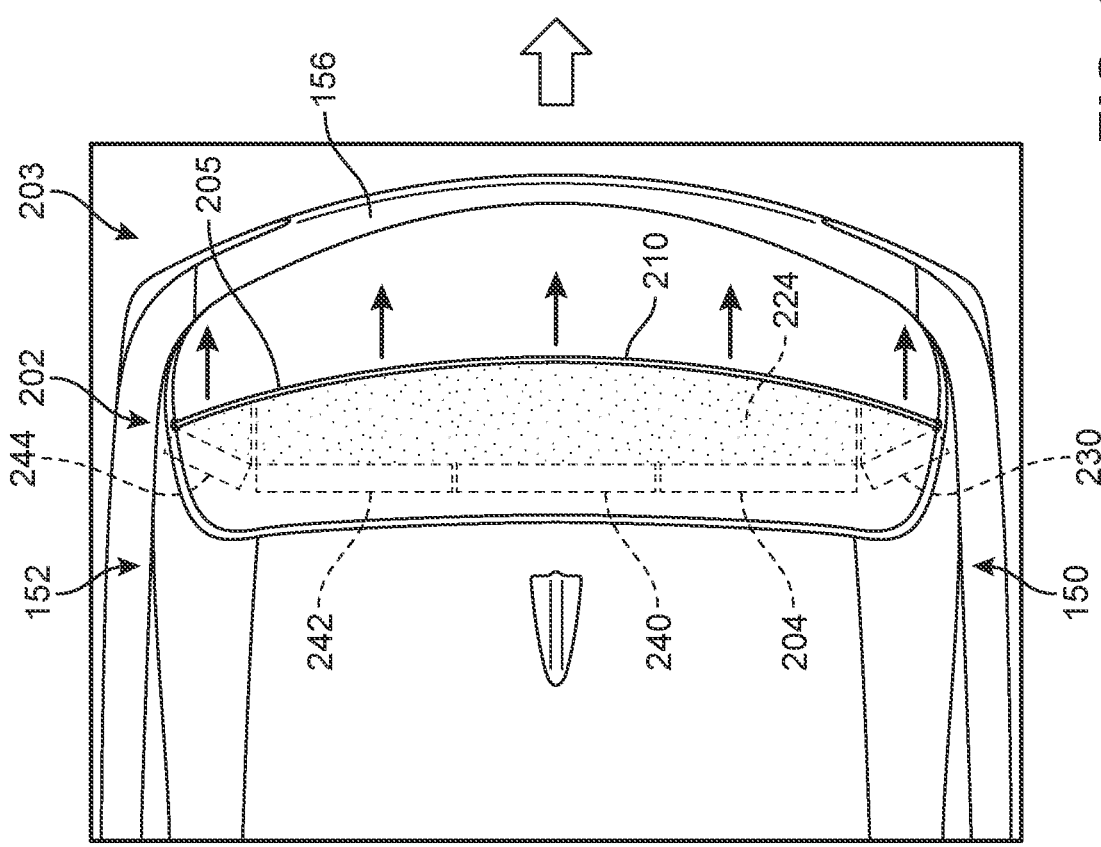

FIG. 3 shows a top view of active spoiler system 202, as previously shown in FIG. 2 and discussed above. In FIG. 3, side roller 230 is shown adjacent to first lateral side 150 while a corresponding second side roller 244 may be correspondingly disposed adjacent to second lateral side 152. Between them, multiple rollers (204, 240, 242) may extend laterally across a width of the motor vehicle 100 between first lateral side 150 and second lateral side 152. In particular, first top roller 204 may be adjacent to first side roller 230 at one end, and first top roller 204 may be adjacent to second top roller 240 and its other end. Second top roller 240 may be disposed laterally between first top roller 204 and third top roller 242.

In this embodiment, each of the multiple top rollers 204, 240, 242 may be connected to a first end of a single flexible sheet 206. Portion 224 of flexible sheet 206 maybe contained within upper spoiler portion 260 as discussed above with respect to FIG. 2. Then, when rigid bar 210 moves from first position 205 to second position 209, flexible sheet 206 may extend outward and rearward to form a spoiler surface 228. Side portion 214 of rigid bar 210 may be attached to side flexible sheet 232 and deploy in a similar manner, as shown. Second side portion 218 of rigid bar 210 may similarly be attached to a second side flexible sheet 233. Active spoiler system 202 may therefore be laterally symmetric, including two side portions 232, 233 and a lateral top portion 228.

Figure 4:
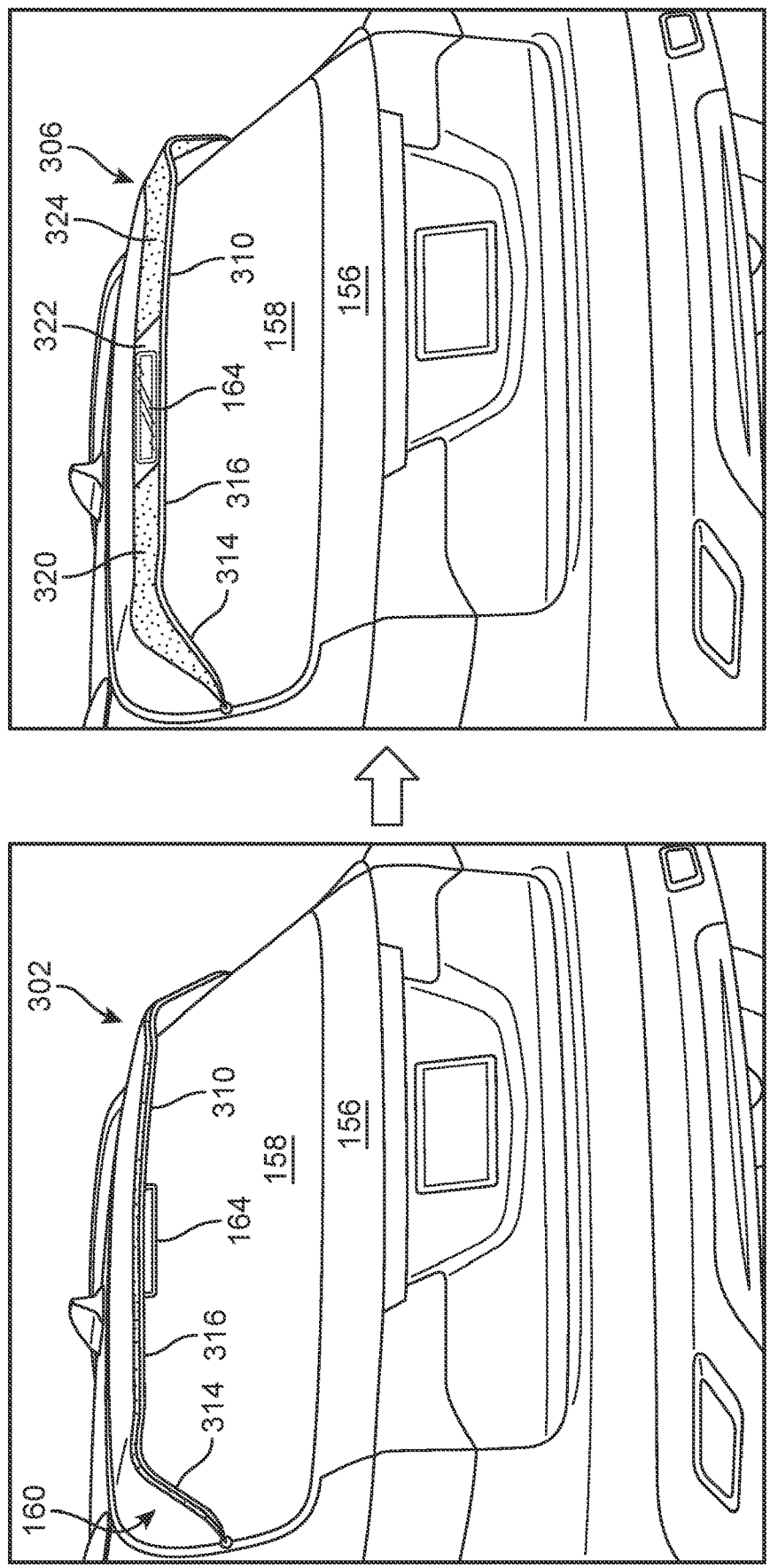
FIG. 4 is an isometric view of a motor vehicle including a third embodiment of an active spoiler system in accordance with this disclosure that includes a clear panel.

FIG. 4 shows a third embodiment of an active spoiler system 302. In this embodiment, rear side 156 of motor vehicle 100 includes a center high mount stop light 164 at a top side of rear window 158 that is just below static upper rear spoiler portion 160. As center high mount stop light 164 is located where a spoiler may deploy, active spoiler system 302 may include a configuration to ensure that center high mount stop light 164 will still be visible when the active spoiler system 302 is deployed.

Specifically, active spoiler system 302 may include a first side flexible sheet 320, a center flexible sheet 322, and a second side flexible sheet 324. In this embodiment, first side flexible sheet 320 and second side flexible sheet 324 may each be attached to center flexible sheet 322. Furthermore, center flexible sheet 322 may comprise a material that is transparent. As a result of center flexible sheet 322 being transparent, center high mount stop light 164 may be visible through center flexible sheet 322.

A transparent material used for center flexible sheet 322 may be a transparent plastic polymer. For example, center flexible sheet 322 may be made from a polyethylene terephthalate (PET), polyvinyl chloride (PVC), polypropylene (PP), polystyrene (PS), polycarbonate (PC), polymethyl methacrylate, or others. Generally, the polymer need be both transparent and also flexible enough to spool onto a roller. Otherwise, materials that may be used for first side flexible sheet 320 or second side flexible sheet 324 may include a fabric, other textiles, synthetic leather, natural leather, and non-transparent polymer sheets. In particular embodiments, a fabric may be used for the flexible sheet in any of the several embodiments discussed in this disclosure. In other particular embodiments, a fabric or a leather (synthetic or natural) may be used in particular as the flexible sheet in any of the several configurations shown variously in the figures and discussed herein.

Additionally, in the embodiment shown in FIG. 4, first side flexible sheet 320 may include both a portion of the lateral width that is attached to center portion 316 of rigid bar 310 and also a vertical side portion that is attached to rigid bar side portion 314. Second side flexible sheet 324 may be symmetrically configured, as well. In this way, flexible sheet 306 may seamlessly extend from first lateral side 150 of motor vehicle 100 to second lateral side 152.

Figure 5:
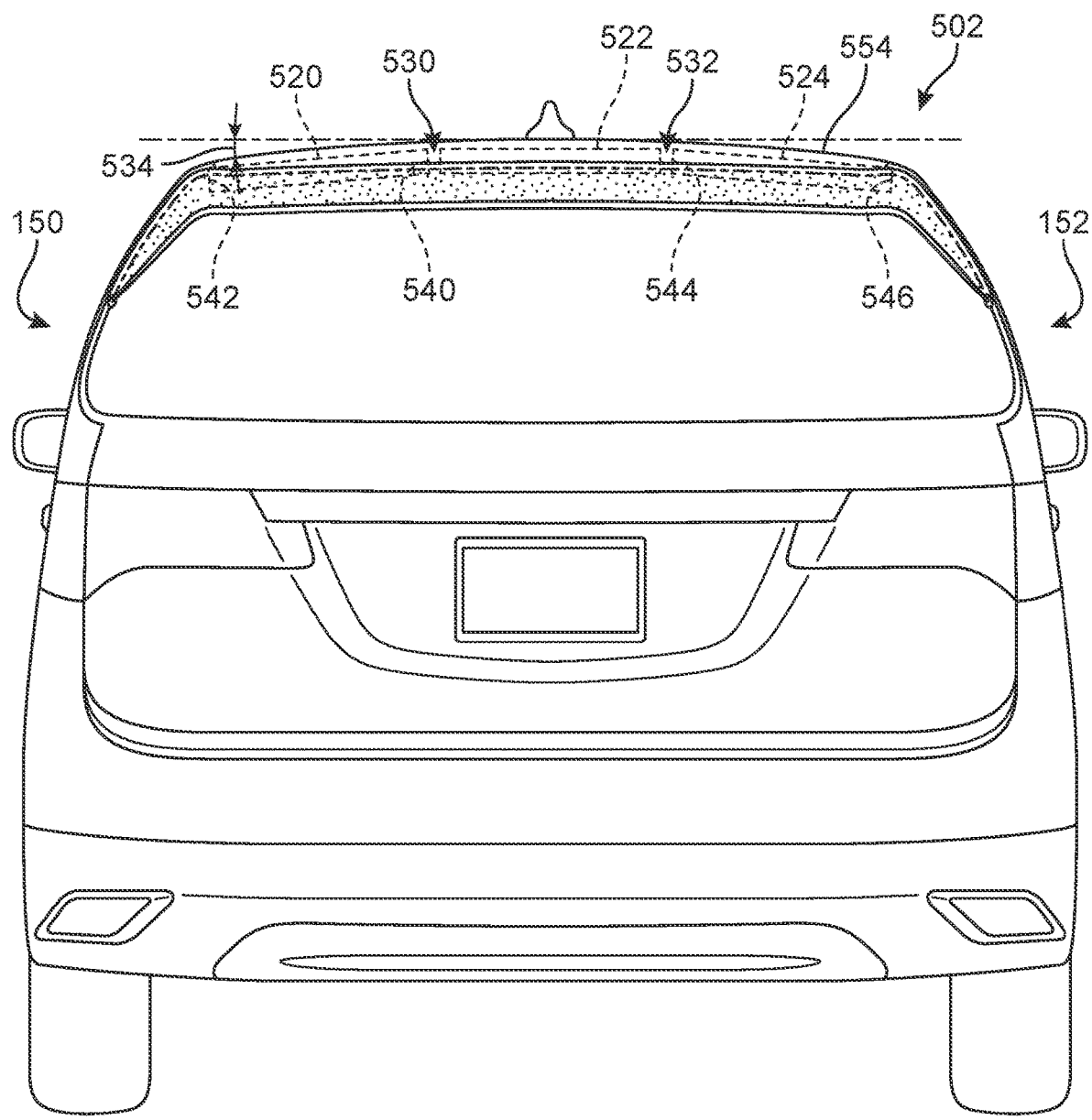
FIG. 5 is a rear view of a motor vehicle including a fourth embodiment of an active spoiler system in accordance with this disclosure that includes multiple rollers following the curvature of the vehicle roof.

Next, FIG. 5 shows a rear view of a motor vehicle including a fourth embodiment of an active spoiler system 502. In this embodiment, active spoiler system 502 may include multiple top surface rollers 520, 522, 524. These rollers may be disposed within an interior of the body of motor vehicle 100 so as to follow the curvature 534 of the roof 554. Namely, the plurality of top surface rollers 520, 522, 524 may follow the roof curvature 534 such that each top surface roller 520, 522, 524 is disposed at an offset angle 530, 532 with respect to an adjacent top surface roller 520, 522, 524.

Specifically, middle top surface roller 522 may be aligned substantially parallel with a center of roof 554. First side top surface roller 520 may then be disposed at an offset angle 530 relative to middle top surface roller 522. Offset angle 530 may be such that first end 540 of first side top surface roller 520 may be vertically higher than second end 542 of first side top surface roller 520. Similarly, offset angle 532 may be such that first end 544 of second side top surface roller 524 may be vertically higher than second end 546 of second side top surface roller 524. In this way, the plurality of top surface rollers 520, 522, 524 may follow the curvature 534 of the roof 554. As a result, this configuration of an active spoiler system may allow for minimizing the interior space taken up by the top surface rollers in order to best use packaging space in the body of the vehicle.

Figure 6:
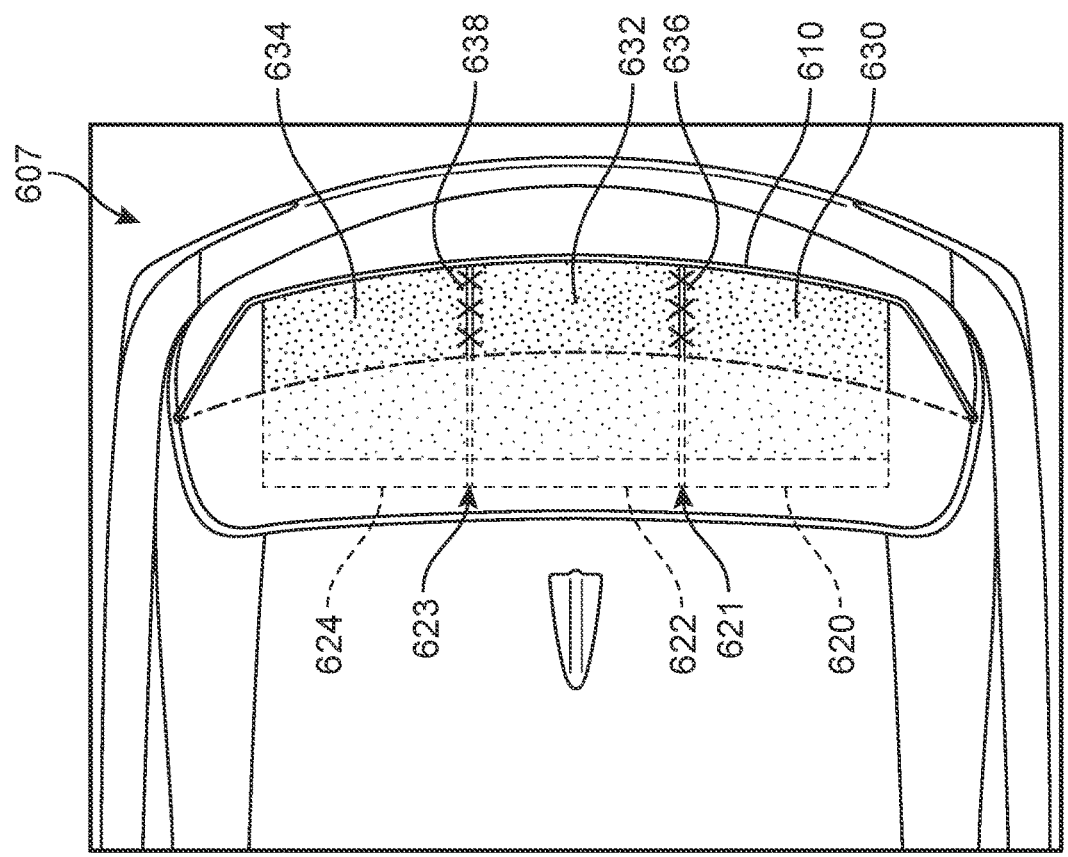
FIG. 6 is top view of a motor vehicle including a fifth embodiment of an active spoiler system in accordance with this disclosure that includes lateral attachments between adjacent portions of the active spoiler.
Figure 6:
Figure 6:
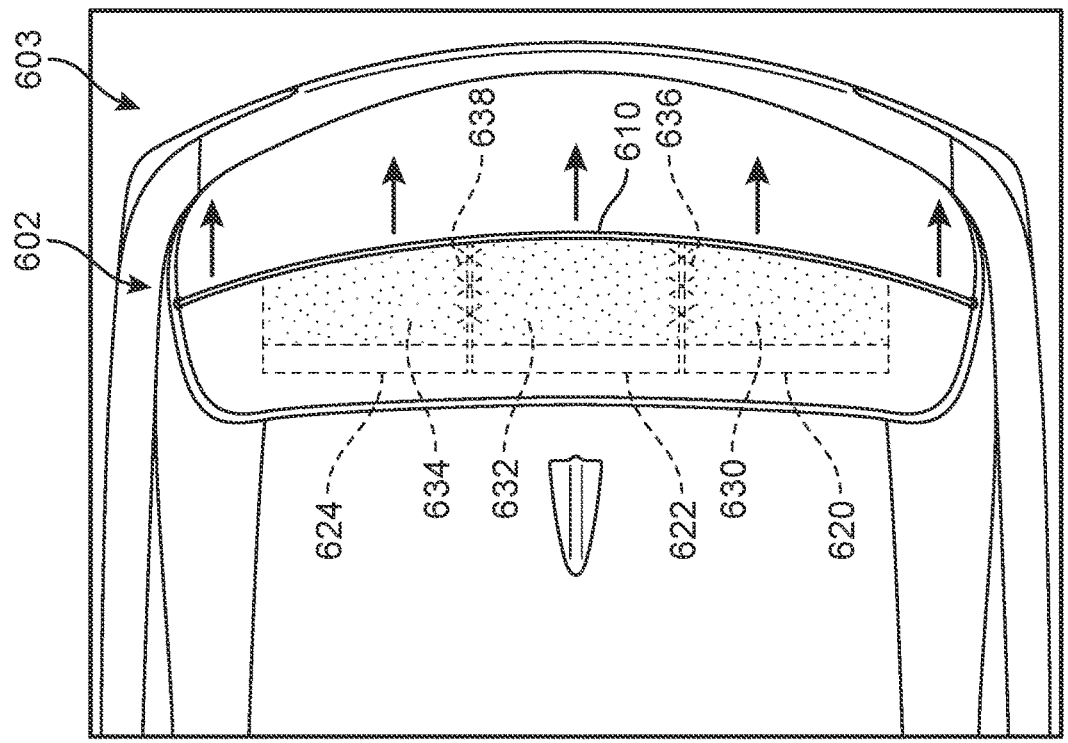

FIG. 6 shows a fifth embodiment of an active spoiler system 602. Active spoiler system 602 may include a plurality of top surface rollers 620, 622, 624 that are each attached to a respective one of a plurality of top surface flexible sheets 630, 632, 634. Specifically, a first side top surface roller 620 may be attached to a first side top surface flexible sheet 630 at a first end (not shown in FIG. 6, as discussed above) of first side top surface flexible sheet 630 such that first side top surface flexible sheet 630 is spooled on first side top surface roller 620 when active spoiler system 602 is in a first, stowed configuration 603. A top surface roller 622 may then be attached to a first end (not shown) of a top surface flexible sheet 632 such that top surface flexible sheet 632 is spooled on top surface roller 622 when active spoiler system 602 is in first configuration 603. Next, a second side top surface roller 624 may be attached to a first end (not shown) of a second side flexible sheet 634 such that second side flexible sheet 634 is spooled on second side top surface roller 624 when active spoiler system 602 is in first configuration 603.

In the embodiment shown in FIG. 6, each flexible sheet 630, 632, 634 may be at least partially attached to an adjacent flexible sheet. Specifically, first side top surface flexible sheet 630 may be attached to top surface flexible sheet 632 along an attachment 636 and second side top surface flexible sheet 634 may be attached to top surface flexible sheet 632 along an attachment 638. Such attachments 636, 638 may be stitching, welding, fastening, hook-and-loop fasteners, or other attachment means.

The attachments 636, 638 between adjacent flexible sheets 630, 632, 634 may be located at least at a second end of each flexible sheet 630, 632, 634 that is attached to the rigid bar 610. As shown in a second, deployed configuration 607, this arrangement may help ensure that the plurality of flexible sheets 630, 632, 634 together form a continuous spoiler surface when deployed. Nonetheless, in this embodiment where attachments 632, 634 do not extend the full length of where the flexible sheets are adjacent to each other, a gap 621, 623 partially remains between the flexible sheets 630, 632, 634. Such a gap 621, 623 may allow the flexible sheets to easily spool onto their respective roller 620, 622, 624 as those rollers follow the curvature of a vehicle roof, as discussed with respect to FIG. 5.

Figure 7:
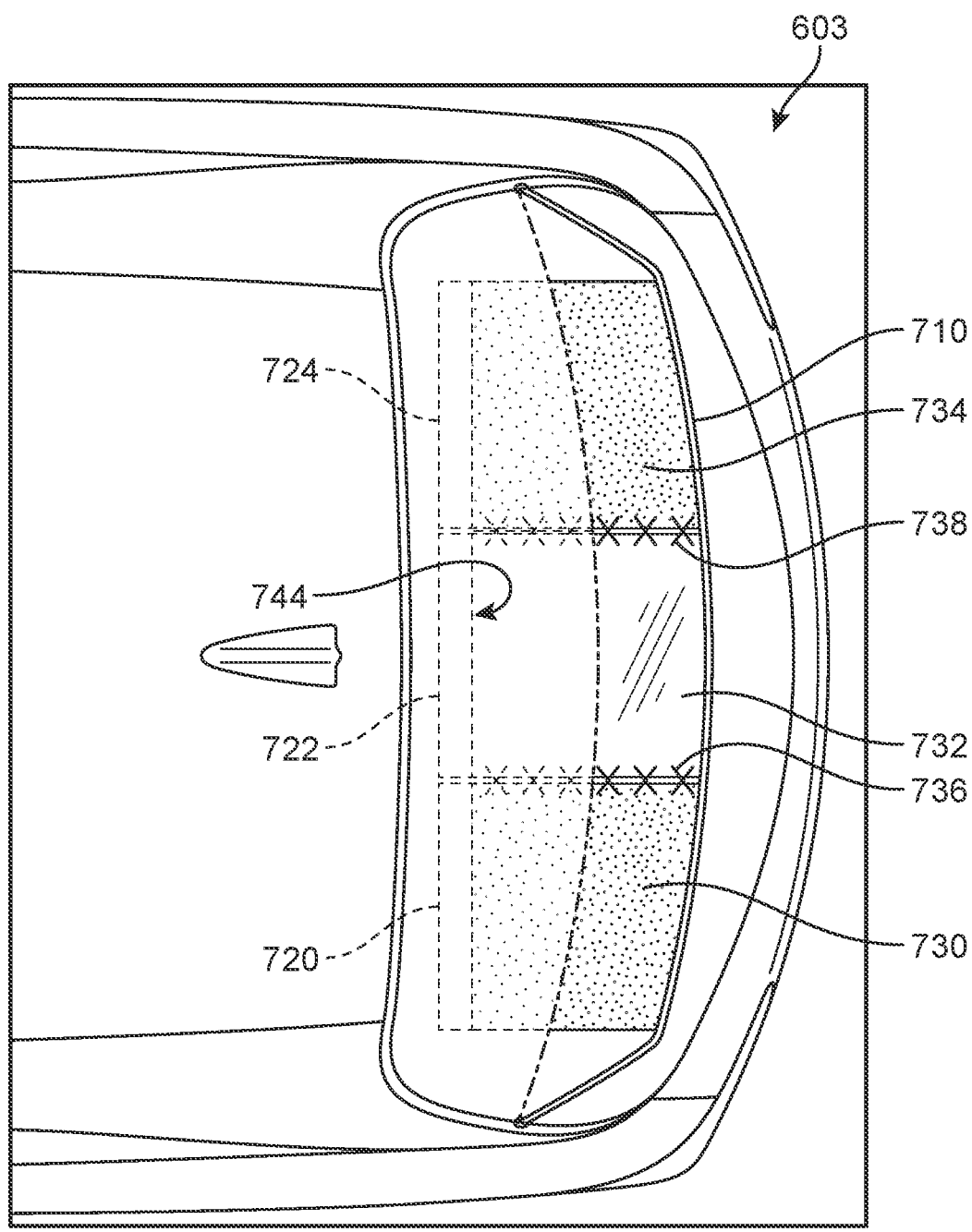
FIG. 7 is a top view of a motor vehicle including a sixth embodiment of an active spoiler system in accordance with this disclosure that includes a clear panel.

FIG. 7 shows a sixth embodiment of an active spoiler system 702. This active spoiler system 702 may include features similar to active spoiler system 602 shown in FIG. 6 and discussed above, as well as features similar to active spoiler system 302 shown in FIG. 4 and discussed above. Specifically, active spoiler system 702 may include a plurality of top surface rollers 720, 722, 724 each attached to a respective flexible sheet 730, 732, 734.

In this embodiment, attachments 736, 738 between adjacent flexible sheets 730, 732, 734 may extend the full length from a first end of each flexible sheet (where it attaches to the respective roller) to a second end of each flexible sheet (where it attached to the rigid bar 710). In this way, each flexible sheet may be fully attached to each adjacent flexible sheet. This may aid in coordinating extension and retraction of the flexible sheets between the deployed and stowed configurations.

Additionally, FIG. 7 shows top surface flexible sheet 732 as being transparent. This embodiment may be used in order to ensure that a center high mount stop light is visible through the active spoiler when it is in a deployed configuration, as is discussed with respect to FIG. 4 above. In other similar embodiments, not shown, at least a portion of top surface flexible sheet 732 may be transparent—such as a "window" of transparent material in a central region of top surface flexible sheet 732 that aligns with the location of the center high mount stop light when the active spoiler system is deployed, but is otherwise surrounded by opaque material in top surface flexible sheet 732.

Figure 8:
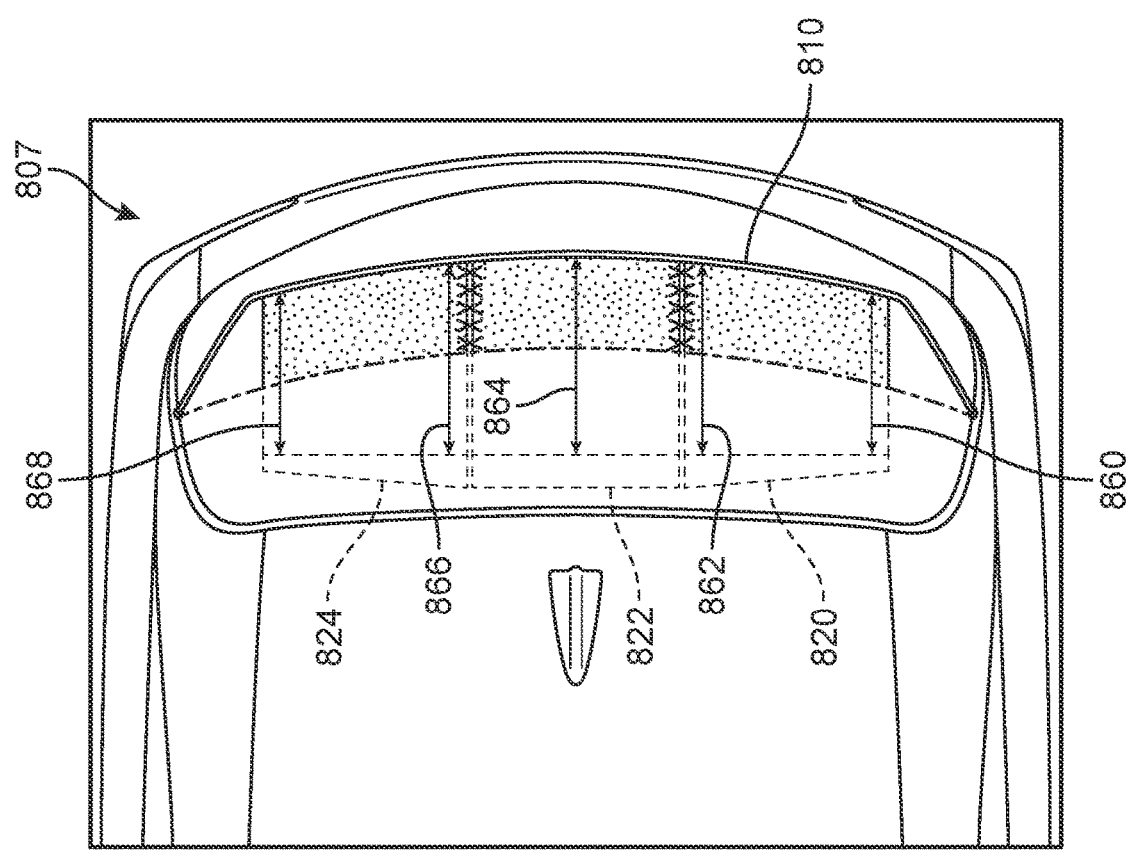
FIG. 8 is a top view of a motor vehicle including a seventh embodiment of an active spoiler system in accordance with this disclosure that includes rollers having smaller diameters at each lateral side.
Figure 8:
Figure 8:
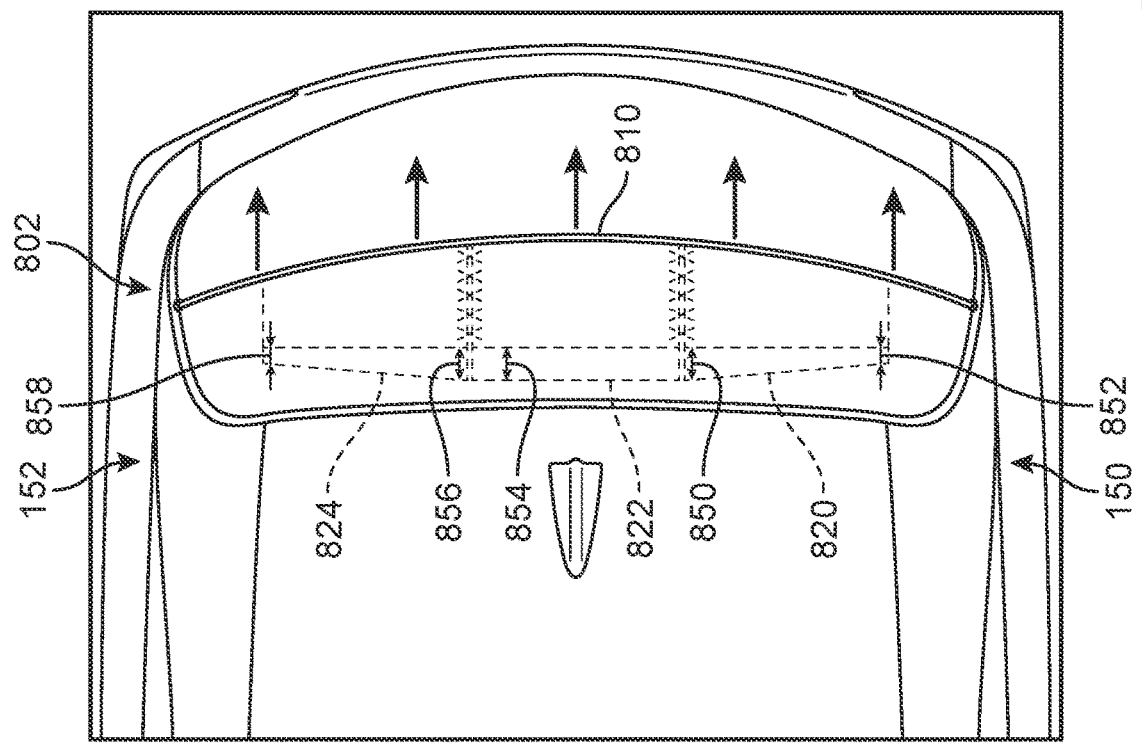

FIG. 8 shows a seventh embodiment of an active spoiler system 802. This active spoiler system 802 also includes a plurality of top surface rollers 820, 822, 824. However, these top surface rollers may have a different shape than shown in other embodiments discussed in this disclosure. Namely, side top surface rollers 820 and 824 may be conical in shape. That is, a first side top surface roller 820 may have a first diameter 850 at an end adjacent to a top surface roller 822, and a second diameter 852 at an opposite end adjacent to first lateral side 150 of motor vehicle 100. Second diameter 852 may be less than first diameter 850. Similarly, a second side top surface roller 824 may have a third diameter 856 at a first end adjacent to top surface roller 822, and a fourth diameter 858 at an opposite end that is adjacent to second lateral side 152 of motor vehicle 100. Fourth diameter 858 may also be less than third diameter 856.

In some embodiments as shown, top surface roller 822 may have a constant diameter 854 that may be substantially the same as first diameter 850 of first side top surface roller 820 and third diameter 856 of second side top surface roller 824.

This configuration may aid in proper stowing of the flexible sheets 820, 822, 824 in view of the lengths of various portions of the flexible sheets differing when deployed. Namely, when active spoiler system 802 is in a second, deployed configuration 807, the total fore-aft length 860 of various portions of the plurality of flexible sheets can be seen. Length 860 may correspond to the distance between rigid bar 810 and end of first side top surface roller 820 adjacent to first lateral side 150, a length 862 may correspond to the distance between rigid bar 810 and the oppose end of first side top surface roller 820 adjacent to top surface roller 822. Length 862 may be larger than length 860. As a result, larger first diameter 850 of first side top surface roller 820 may spool this larger length with an equal number of rotations as maybe necessary to spool length 860 onto second diameter 852. Roller 824 may be symmetric with respect to a length 866 being larger than a length 868. As a result of this configuration, the flexible sheets may easily and smoothly spool onto the respective roller while optimizing the storage space needed within the interior of the motor vehicle body.

Figure 9:
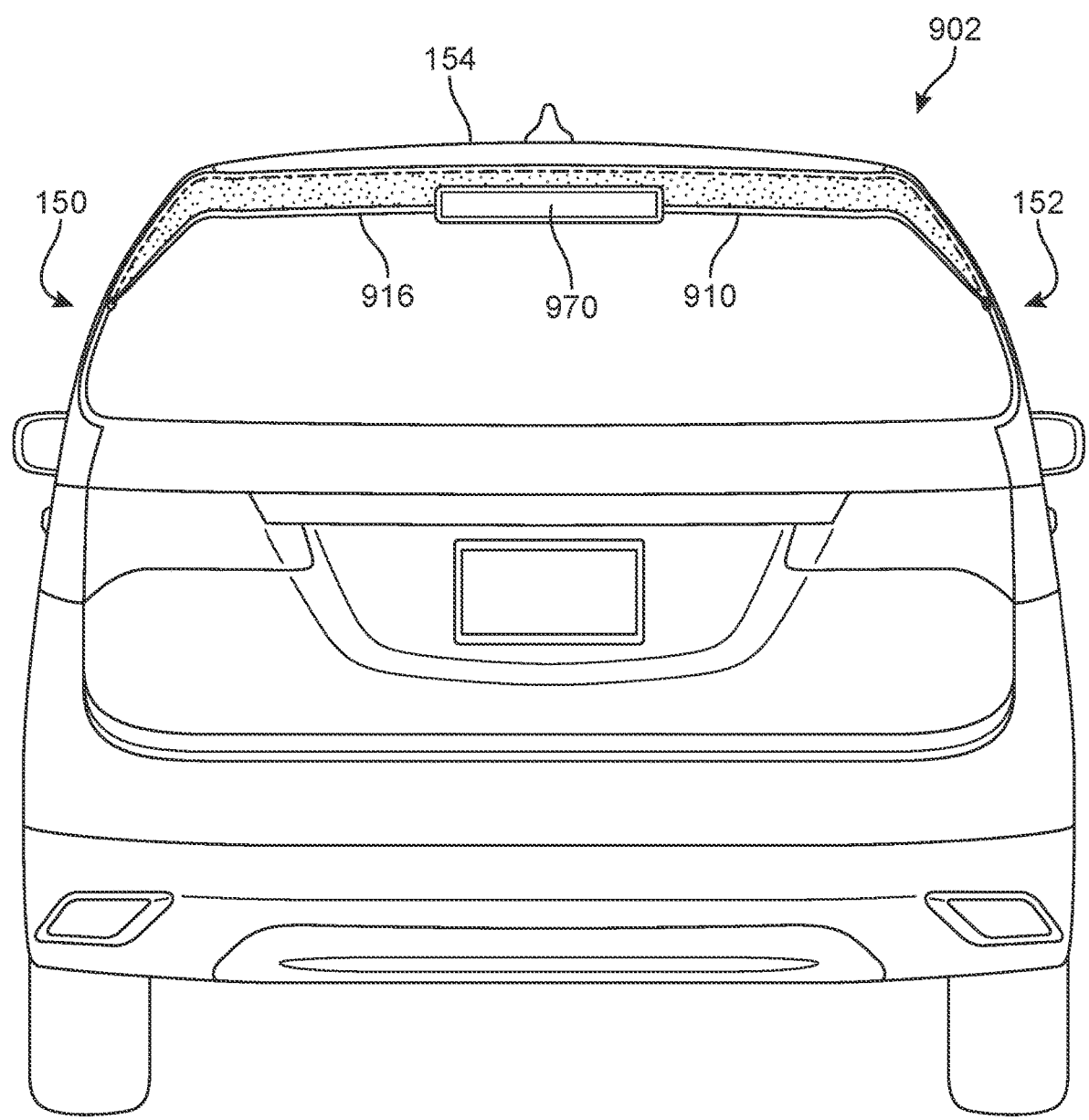
FIG. 9 is a rear view of a motor vehicle including an eighth embodiment of an active spoiler system in accordance with this disclosure that includes a rear center high mount stop light.

FIG. 9 shows an eighth embodiment of an active spoiler system 902. In this embodiment, a rigid bar 910 may include a center high mount stop light 970 therein. Specifically, center high mount stop light 970 may be included in a center portion 916 of rigid bar 910, such that center high mount stop light 970 may be located laterally in the center of rear side 156 of motor vehicle 100. As a result, center high mount stop light 970 may be separated from roof 154 and instead be a part of rigid bar 910.

This embodiment may advantageously allow the center high mount stop light 970 to be viewed regardless of whether active spoiler system 902 is stowed or deployed. This may be an alternative to embodiments such as are shown in FIG. 4 and FIG. 7.

Figure 10:
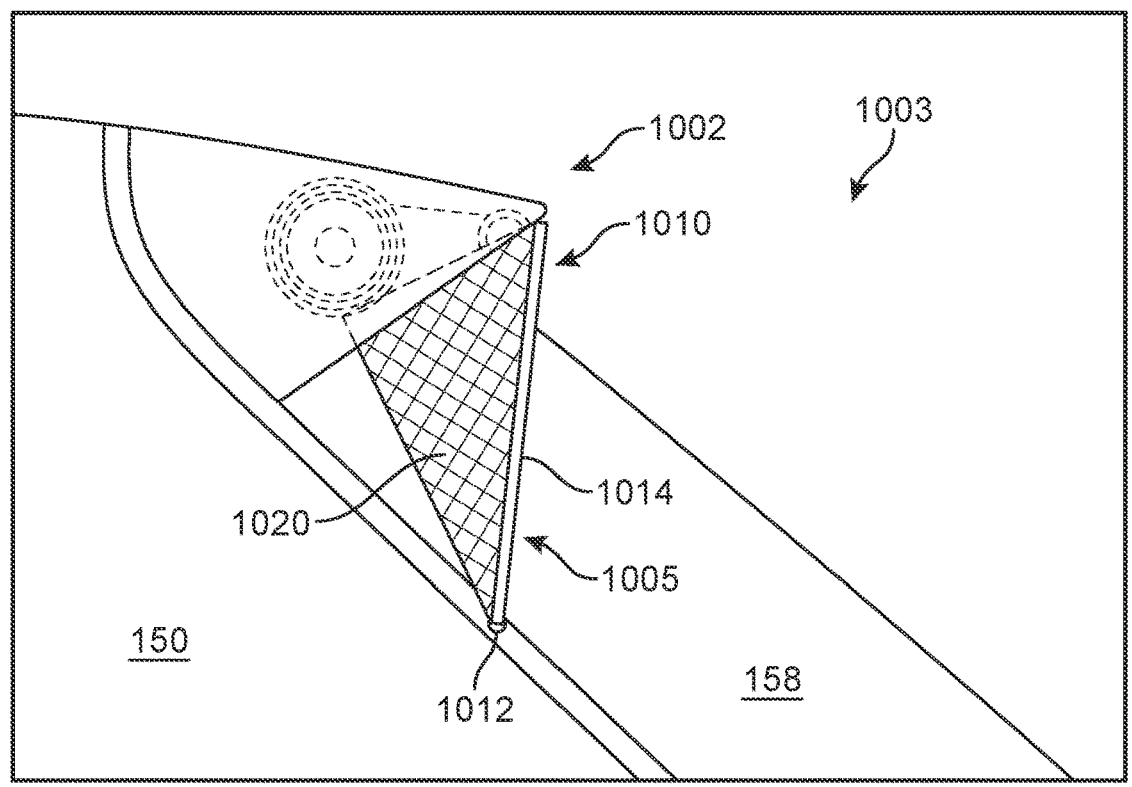
FIG. 10 is a side view of a motor vehicle including a ninth embodiment of an active spoiler system in accordance with this disclosure that includes a rotatable solid side panel.
Figure 10:
Figure 10:
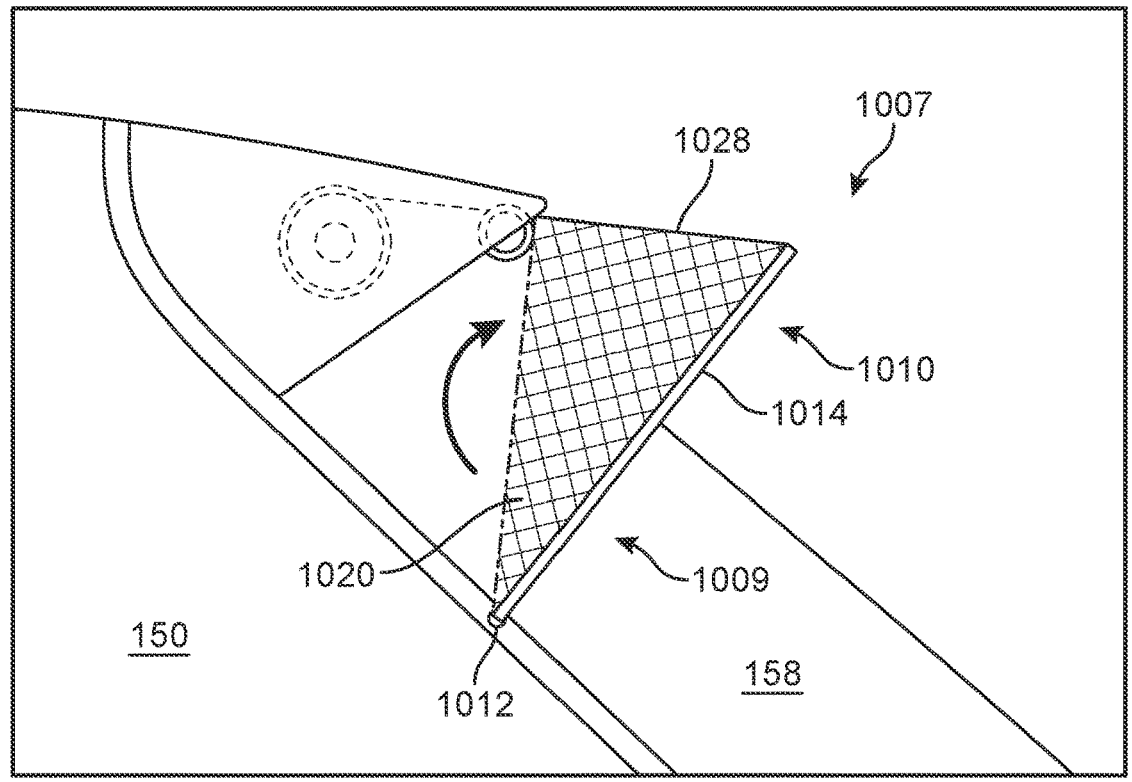

Finally, FIG. 10 shows a ninth embodiment of an active spoiler system 1002. Active spoiler system 1002 may include a rigid lateral portion 1020. Rigid lateral portion 1020 may be disposed adjacent to first lateral side 150, instead of a side roller such as is shown in FIG. 2 and discussed above. Generally, a side portion of an active spoiler system (such as either a rigid lateral portion 1020 or a side roller) may be referred to as a side screen.

Rigid lateral portion 1020 may rotate about a pivot 1012, by approximately a rotational degree that is less than about 45 degrees in order to move from a stowed configuration 1003 to a deployed configuration 1007. The angle of rotation that rigid lateral portion 1020 rotates when moving from the stowed configuration 1003 to the deployed configuration 1007 may depend on the location of pivot point 1012 and the desired spoiler extension angle and length when deployed.

Specifically, rigid lateral portion 1020 may be attached to rigid bar 1010 at a portion 1014. Then, when rigid bar 1010 moves from a first position 1005 to a second position 1009, rigid lateral portion 1020 may rotate around pivot 1012.

Rigid lateral portion 1020 may also be configured to reversibly attach to an adjacent top surface flexible sheet 1028. For example, rigid lateral portion 1020 may include a C-channel formed therein, into which an edge of flexible sheet 1028 may engage when the active spoiler system 1002 is in a deployed configuration 1007. In this way, rigid lateral portion 1020 may form a side portion of the active spoiler that securely forms a spoiler surface with flexible sheet 1028.

An active spoiler system 1002 may have first side rigid lateral portion 1020 adjacent to first lateral side 150 of the motor vehicle 100, and also have a symmetric second side rigid lateral portion (not shown) on second lateral side 152 of motor vehicle 100.

As a result of the active spoiler systems discussed herein above, a motor vehicle may achieve reduced drag. The specific structures disclosed herein may be expected to reduce total drag on the vehicle by at least about 1% to at least about 6%. This may therefore allow the vehicle (e.g., motor vehicle 100) to achieve increased fuel efficiency, reducing the vehicle's environmental impact. At the same time, the active spoiler may also be stowed when conditions might be disadvantageous based on factors such as speed or weather.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A vehicle including an active spoiler system comprising:
  a flexible sheet;
  a roller housed in an interior of a vehicle body, the roller being attached to a first end of the flexible sheet such that at least a portion of the flexible sheet is spooled on the roller when the active spoiler system is in a first configuration;
  a rigid bar located on a rear side of the vehicle, the rigid bar being attached to a second end of the flexible sheet;
  wherein the rigid bar is configured to move from a first position to a second position in such a way as to cause the flexible sheet to unspool from the roller and extend outward from the rear side of the vehicle thereby acting as a spoiler when the active spoiler system is in a second configuration.

2. The vehicle of claim 1, wherein
  the roller and the spooled portion of the flexible sheet are housed within a static upper rear spoiler on an upper portion of the rear side of the vehicle;
  the rigid bar rotates rearward and downward around an axis in order to move from the first position to the second position;
  the rigid bar extends horizontally across the rear side of the vehicle from a first lateral side of the vehicle to a second lateral side of the vehicle; and
  the roller is aligned substantially parallel with a roof of the vehicle, such that the unspooled flexible sheet extends laterally across at least a portion of a width of the vehicle when the active spoiler system is in the second configuration.

3. The vehicle of claim 1, wherein the active spoiler system further includes:
  a side roller, the side roller being aligned vertically along a lateral side of the vehicle and located such that one end of the side roller is substantially adjacent to one end of the roller;
  the side roller being attached to a first end of a side flexible sheet;
  the side flexible sheet being attached to the rigid bar at a second end of the side flexible sheet, substantially adjacent to where the flexible sheet attaches to the rigid bar;
  wherein the side flexible sheet is at least partially spooled on the side roller when the active spoiler system is in the first configuration, and the side flexible sheet extends outward from the lateral side of the vehicle thereby acting as the spoiler in conjunction with the flexible sheet when the active spoiler system is in the second configuration.

4. The vehicle of claim 1, wherein the active spoiler system is located on a motor vehicle trunk lid.

5. The vehicle of claim 1, wherein
the flexible sheet comprises a portion that is at least partially transparent; and
the at least partially transparent portion is located over a center high mount stop light when the active spoiler system is in the second configuration.

6. The vehicle of claim 1, wherein the rigid bar further includes a center high mount stop light therein.

7. A vehicle including an active spoiler system comprising:
a plurality of rollers, each roller being housed in an interior of a vehicle body at an upper portion of a rear side of the vehicle;
a plurality of flexible sheets, each flexible sheet being attached to one of the plurality of rollers at a respective first of each flexible sheet end such that at least a portion of each flexible sheet is spooled on each respective roller when the active spoiler system is in a first configuration;
a rigid bar located on the rear side of the vehicle, and extending horizontally across the rear side of the vehicle from a first lateral side of the vehicle to a second lateral side of the vehicle, the rigid bar being attached to each of the plurality of flexible sheets at a respective second end of each flexible sheet;
wherein the rigid bar is configured to rotate rearward and downward around an axis in order to move from a first position to a second position, the rotation of the rigid bar causing each of the plurality of flexible sheets to unspool from each of the respective plurality of rollers and extend outward from the rear side of the vehicle thereby acting as a spoiler when the active spoiler system is in a second configuration.

8. The vehicle of claim 7, wherein
each of the plurality of rollers are aligned substantially parallel with a roof of the vehicle, the roof having a shape with a curvature and the plurality of rollers following the roof curvature shape.

9. The vehicle of claim 7, wherein
one of the plurality of the flexible sheets, located above a center high mount stop light disposed on the rear side of the vehicle, is transparent; and
the transparent flexible sheet is located over the center high mount stop light when the active spoiler system is in the second configuration.

10. The vehicle of claim 7, wherein
each of the plurality of flexible sheets is at least partially attached to each adjacent flexible sheet, at least at the second end of each flexible sheet; and
each of the plurality of flexible sheets is made from a fabric.

11. The vehicle of claim 7, wherein
a first outer roller, located adjacent to a middle roller, has a first diameter at a first end of the first outer roller closer to the middle roller and has a second diameter at a second end closer to a first lateral side of the vehicle;
the first diameter being larger than the second diameter;
a second outer roller, located adjacent to the middle roller horizontally opposite the first outer roller, has a third diameter at a first end of the second outer roller that is closer to the middle roller and has a fourth diameter at a second end of the second outer roller that is closer to a second lateral side of the vehicle; and
the third diameter being larger than the fourth diameter.

12. The vehicle of claim 7, wherein
each of the plurality of rollers are housed within a static upper rear spoiler on an upper portion of the rear side of the vehicle; and
the static upper rear spoiler includes one or more pulleys located at an outermost edge of the static upper rear spoiler, the one or more pulleys being configured to align the plurality of flexible sheets as they unspool from the plurality of rollers when the active spoiler system changes from the first configuration to the second configuration.

13. The vehicle of claim 7, wherein the active spoiler system further includes:
a first side roller, the first side roller being aligned vertically along a first lateral side of the vehicle;
the first side roller being attached to a first end of a first side flexible sheet;
a second side roller, the second side roller being aligned vertically along a second lateral side of the vehicle;
the second side roller being attached to a first end of a second side flexible sheet;
the first side flexible sheet and the second side flexible sheet being attached to the rigid bar at a respective second end;
wherein each of the first side flexible sheet and the second side flexible sheet is at least partially spooled on the respective side roller when the active spoiler system is in the first configuration; and
wherein each of the first side flexible sheet and the second side flexible sheet extends outward from the respective lateral side of the vehicle thereby acting as the spoiler in conjunction with the plurality of flexible sheets when the active spoiler system is in the second configuration.

14. The vehicle of claim 7, wherein the active spoiler system further includes:
a first side rigid lateral portion, located adjacent to a first lateral side of the vehicle; and
a second side rigid lateral portion, located adjacent to a second lateral side of the vehicle;
wherein each of the first side rigid lateral portion and the second side rigid lateral portion are configured to rotate around the axis around which the rigid bar also rotates;
wherein each of the first side rigid lateral portion and the second side rigid lateral portion are configured to reversibly attach to an adjacent center flexible sheet when the active spoiler system is in the second configuration; and
wherein each of the first side rigid lateral portion and the second side rigid lateral portion include a c-channel formed therein, into which an edge of the center flexible sheet may engage when the active spoiler system is in the second deployed configuration.

15. An active spoiler apparatus comprising:
a center flexible sheet;
a center roller housed in an interior of a vehicle body at a upper portion of a rear side of the vehicle, the center roller being attached to a first end of the center flexible sheet such that at least a portion of the center flexible sheet is spooled on the center roller when the active spoiler system is in a first configuration;
a side screen located adjacent to a lateral side of the vehicle;
the side screen being aligned vertically along the lateral side of the vehicle, the side screen further being at least partially stowed in the interior of the vehicle body when the active spoiler system is in the first configuration;

a rigid bar located on a rear side of the vehicle, the rigid bar being attached to a second end of the flexible sheet, a second end of the first side flexible sheet, and a second end of the second side flexible sheet; and wherein the rigid bar is configured to move from a first position to a second position in such a way as to cause the center flexible sheet to unspool from the center roller and extend outward, and cause the side screen to move from a first position to a second position, thereby acting as a spoiler when the active spoiler system is in a second configuration.

16. The active spoiler apparatus of claim 15, wherein the side screen includes
- a first side roller, the first side roller being aligned vertically along a first lateral side of the vehicle;
- the first side roller being attached to a first end of a first side flexible sheet such that at least a portion of the first side flexible sheet is spooled on the first side roller when the active spoiler system is in the first configuration;
- a second side roller, the second side roller being aligned vertically along a second lateral side of the vehicle; and
- the second side roller being attached to a first end of a second side flexible sheet such that at least a portion of the second side flexible sheet is spooled on the second side roller when the active spoiler system is in the first configuration.

17. The active spoiler apparatus of claim 15, wherein the side screen includes
- a first side rigid lateral portion, located adjacent to a first lateral side of the vehicle; and
- a second side rigid lateral portion, located adjacent to a second lateral side of the vehicle;
- wherein each of the first side rigid lateral portion and the second side rigid lateral portion are configured to rotate around the axis around which the rigid bar also rotates;
- wherein each of the first side rigid lateral portion and the second side rigid lateral portion are configured to reversibly attach to the center flexible sheet when the active spoiler system is in the second configuration.

18. The active spoiler apparatus of claim 15, wherein the rigid bar further includes a center high mount stop light therein.

19. The active spoiler apparatus of claim 15, wherein each of the center flexible sheet, the first side flexible sheet, and the second side flexible sheet is made from a fabric.

20. The active spoiler apparatus of claim 15, wherein the center flexible sheet is transparent; and the active spoiler system is located on a motor vehicle trunk lid.

* * * * *